Figure 1:
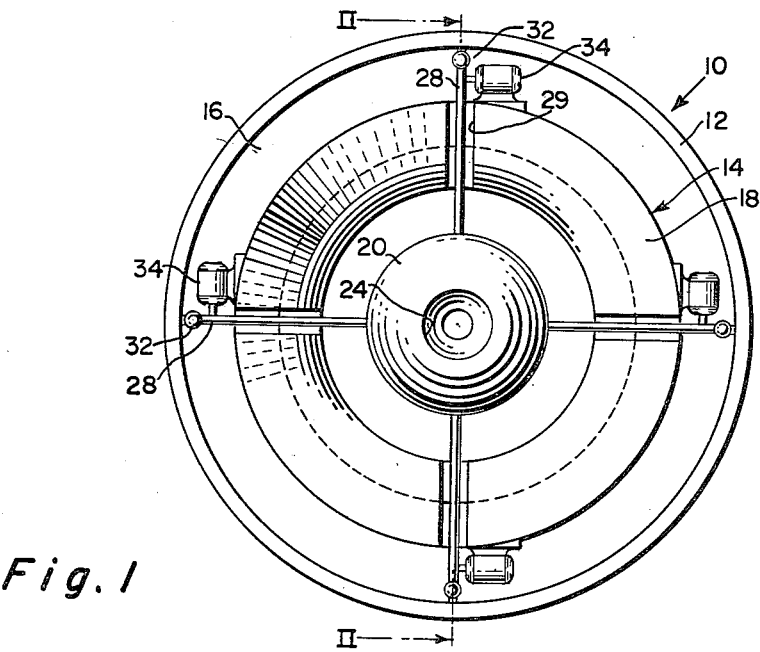

April 28, 1964     S. J. PENZA     3,130,544

VARIABLE THRUST AND DIRECTION NOZZLE

Filed Oct. 23, 1961

INVENTOR.
SALVATORE J. PENZA

BY George J. Rubens
ATTORNEY

3,130,544

VARIABLE THRUST AND DIRECTION NOZZLE
Salvatore J. Penza, Oxnard, Calif., assignor to the United States of America as represented by the Secretary of the Navy
Filed Oct. 23, 1961, Ser. No. 147,169
8 Claims. (Cl. 60—35.54)
(Granted under Title 35, U.S. Code (1952), sec. 266)

The invention described herein may be manufactured and used by or for the Government of the United States of America for governmental purposes without the payment of any royalties thereon or therefor.

This invention relates to reaction type motors, and more particularly to a nozzle for such a motor having means for varying the amount of thrust and/or the direction of the thrust of said nozzle simultaneously or independently.

The art of reaction motor nozzle design has greatly advanced in recent years, and many types of devices have been proposed to vary either the amount or direction of thrust. For the most part the means for varying thrust in liquid fuel motors relied on throttling the fuel supply which requires complicated hydraulic systems. Varying the thrust of solid propellant reaction motors presents even a greater problem. Nozzle arrangements for varying the direction of thrust have included an entire nozzle constructed for rotation within the missile which obviously necessitates large support and control mechanisms. Other devices for varying thrust direction utilize vanes of different types and, configurations positionable in the jet stream, either inside or outside of the nozzle. It is important to note that none of the prior art devices utilized a single means which could accomplish the task of both varying the speed and/or the direction of the reaction motor at the same time and in any other controlled sequence.

The present invention provides a novel device that can control both the speed and thrust direction of a reaction type jet engine. The device comprises a plug positionable within the main or outer nozzle, the plug having an internal nozzle extending therethrough. In a neutral thrust direction position, the internal nozzle normally is aligned coaxial with the longitudinal axis of the outer nozzle. The configuration of the internal nozzle of the plug may be converging-diverging, converging, diverging, cylindrical, or otherwise constructed. In a preferable embodiment, the plug is supported within the outer nozzle for universal movement, and is controlled by a mechanism which enables the plug to move longitudinally within the conventional variable diameter nozzle throat thereby varying the amount of effective exhaust flow and, consequently, the speed of the engine. The plug is also capable of rotating about axis transverse to the longitudinal axis for varying the direction of that diverted portion of jet flow passing through the inner nozzle, and consequently, the direction of movement of the supporting vehicle.

One object of the present invention is to provide an improved means for varying both the speed and direction of a jet propelled vehicle in a fluid environment.

Other objects of the invention are to provide such a jet control means which has unlimited use on both solid and liquid reaction type motors; which is simple in construction and easily controlled; and which will cause a minimum of vibration and distortion of mass exhaust flow.

Figure 2:
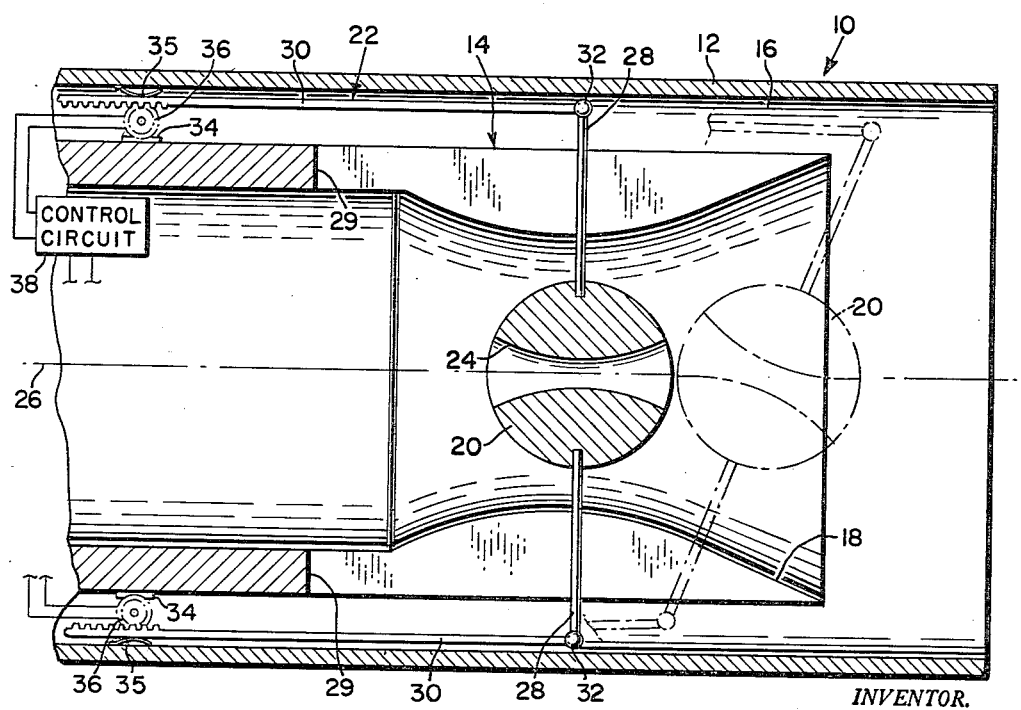

Other objects and many of the attendant advantages of this invention will be readily appreciated as the same becomes better understood by reference to the following detailed description when considered in connection with the accompanying drawings wherein:

FIG. 1 is an aft elevation view of a vehicle employing a reaction-type motor showing the novel nozzle construction according to the invention, and FIG. 2 is a partial longitudinal section of the nozzle end of the vehicle taken along line II—II of FIG. 1.

Referring to the drawing where like reference numerals refer to similar parts throughout the drawing there is shown an aft or nozzle end of a jet propelled vehicle 10 having an outer skin 12 and a fixed converging-diverging type nozzle 14 concentrically positioned therein and separated therefrom by an annular space 16. The nozzle which forms a component of a jet motor, not shown, is provided with a variable area throat portion 18. Supported within throat 18 is a smaller diameter plug 20 movable therein by a control mechanism 22 presently to be described.

As plug 20 is positioned in the jet exhaust flow passing through the nozzle, it should be configured to offer a minimum of resistance or distortion to the flow when rotated in its various positions, and, accordingly, the plug is shown as spherical, although other aerodynamic shapes could be employed. The plug is constructed with a passageway 24 extending therethrough, the axis of which in the neutral position is preferably coextensive with a longitudinal axis 26 of the jet motor. Since passageway 24 is in effect a nozzle it can be referred to as an internal nozzle positioned within outer nozzle 18. Passageway 24 may be cylindrical, converging, diverging, or converging-diverging, the latter design being illustrated in the drawing.

As previously described, plug 20 is supported within the outer nozzle by control mechanism 22 which comprises a plurality of radially disposed arms 28, four being illustrated, fixedly secured at their inner ends to the plug. An end portion of outer nozzle 14 is longitudinally slotted at 29 to permit longitudinal movement of arms 28. The outer ends of arms 28 are articulated to longitudinal control rods 30 by ball and socket connections 32, or the like, to permit relative movement therebetween. Each control rod 30 is preferably actuated by a separate drive means, such as a reversible electric motor 34 through a worm wheel arrangement 36, control rod 22 being maintained in engagement with the worm wheel by a simple leaf spring 35. However, since plug 20 must be able to rotate about transverse axes to provide thrust direction, a control circuit 38 is employed to provide the necessary coordination between the separated drive means so that for example, if the vehicle is to be provided a nosedown signal the plug is rotated clockwise to the broken line position in FIG. 2 in which case a differential movement is required between the upper and lower control rods 30. In other words, as appears in FIG. 2 the upper control rod would move aft and the lower control rod would move forward which movements would be coordinated through control circuit 38. If these control rods are moved the same amount in opposite directions plug 20 will rotate about a transverse axis intersecting the longitudinal axis 26 of nozzle 14 (see broken line position), however, unequal movements of the control rods would move the plug off the longitudinal axis which may be desirable in certain situations.

The broken-line position of plug 20 in FIG. 2 not only illustrates the plug rotated to a new position for thrust direction, but also illustrates a longitudinal movement of the plug aft within the outer nozzle to increase the amount of effective nozzle flow and, accordingly, to increase the thrust from the nozzle. Thus, the control circuit functions to signal motors 34 to move the respective control rods in the directions to account for both changes in amount of thrust and direction of thrust. It is noted that the two lateral control rods not appearing in FIG. 2 are moved aft only an amount to vary the thrust, there being no movement of the rods to account for the rotation of plug 20 since the axis of rotation of the plug coincides with the lateral control arms.

It is apparent that the desired direction of travel of the vehicle can be accomplished by rotating the plug in four basic directions (up down and to each side) by a suitable control, or by rotating the plug to intermediate positions by coordinated movement of two adjacent control rods.

The instant invention provides a simple mechanism for controlling both the amount and direction of thrust control of a jet propelled vehicle while causing a minimum vibration and distortion of the exhaust flow. The means described for supporting and controlling the movement of the plug is only one way of accomplishing the desired result.

Obviously many modifications and variations of the present invention are possible in the light of the above teachings. It is therefore to be understood that within the scope of the appended claims the invention may be practiced otherwise than as specifically described.

I claim:

1. In combination with a jet propulsion motor having a longitudinal axis, a jet nozzle having a varying diameter throat, a jet direction control device supported within said throat in spaced relation thereto, said control device having means for deflecting only a portion of the nozzle flow, and means for moving said device longitudinally within said throat and about a plurality of axes transverse to said longitudinal axis whereby the volume and direction of flow through said nozzle can be varied to change the speed and direction of exhaust flow respectively through said nozzle.

2. The motor of claim 1 wherein said supporting means provides a universal movement of the device.

3. The control device of claim 1 wherein said device is an aerodynamic body, and said means for deflecting is a open passageway forming an internal nozzle extending through said body for diverting a portion of said nozzle flow.

4. The control device of claim 3 wherein said body is spherical.

5. The control device of claim 3 wherein said passageway is uniform in width.

6. The control device of claim 3 wherein said passageway varies in diameter.

7. The control device of claim 3 wherein said passageway is converging-diverging.

8. A jet propulsion engine having an outer throat exhaust nozzle of varying diameter with a longitudinal axis, said nozzle having a peripheral wall formed with a plurality of longitudinal slots, a plug supported within the outer nozzle, said plug being of a smaller size than the outer nozzle throat to permit movement therethrough, said plug having an internal nozzle extending therethrough adapted to divert a portion of the flow through the outer nozzle, means for supporting said plug within the outer nozzle for universal movement including a plurality of articulated linkage, means for moving said linkage and said plug along the longitudinal axis of the outer nozzle to vary the volume of flow therethrough and for rotating the plug about an axis transversal to said longitudinal axis for varying the direction of flow through said internal nozzle.

References Cited in the file of this patent

UNITED STATES PATENTS

| 1,698,822 | Paxton | Jan. 15, 1929 |
| 2,575,735 | Servanty | Nov. 20, 1951 |
| 3,040,523 | Price | June 26, 1962 |

FOREIGN PATENTS

| 14,631 | Great Britain | Sept. 14, 1905 |